United States Patent [19]

Hopkins

[11] Patent Number: 5,254,916
[45] Date of Patent: Oct. 19, 1993

[54] WINDSHIELD WIPER SPEED AND DELAY CONTROL

[75] Inventor: Thomas Lea R. Hopkins, Cary, Ill.

[73] Assignee: SGS-Thomson Microelectronics, Inc., Carrollton, Tex.

[21] Appl. No.: 923,217

[22] Filed: Jul. 31, 1992

[51] Int. Cl.$^5$ ............................................... H02P 1/00
[52] U.S. Cl. ............................. 318/443; 318/DIG. 2; 15/250.13
[58] Field of Search ............... 318/443, 444, DIG. 2, 318/280–286; 307/10.1, 9.1; 15/250.12, 250.13, 250.27

[56] References Cited

U.S. PATENT DOCUMENTS

| | | | |
|---|---|---|---|
| 4,388,574 | 6/1983 | Bois et al. | 318/443 |
| 4,435,648 | 3/1984 | Goode, III | 307/10.1 |
| 4,578,591 | 3/1986 | Floyd et al. | 307/10.1 |
| 4,663,575 | 5/1987 | Juzswik et al. | 318/444 |
| 4,665,488 | 5/1987 | Graham et al. | 318/DIG. 2 |
| 4,705,997 | 11/1987 | Juzswik | 318/443 |
| 4,823,058 | 4/1989 | Buchanan, Jr. et al. | 318/443 |

*Primary Examiner*—Jonathan Wysocki
*Attorney, Agent, or Firm*—Richard A. Bachand; Lisa K. Jorgenson; Richard K. Robinson

[57] ABSTRACT

A windshield wiper system and method includes a dc motor for connection to drive a windshield wiper. A motor current switch controls current through a field winding of the dc motor. First and second speed selection switches are provided for selecting a speed desired for the windshield wiper. Means responsive to actuation of the first speed selection switch operates the motor current switch to control the current through the field winding of the dc motor for a first duty cycle, and means responsive to actuation of the second speed selection switch operates the motor current switch to control the current through the field winding of the dc motor for a second duty cycle different from the first duty cycle. A delay switch is provided, and a motor drive circuit responsive to a first activation of the switch enables the circuit for operating the motor to drive the windshield wiper once. A circuit responsive to a second activation of the switch enables the motor drive circuit to drive the windshield wiper at intervals determined by a time between the first and second activations of the switch.

26 Claims, 4 Drawing Sheets

FIG. 2A

WINDSHIELD WIPER SPEED AND DELAY CONTROL

BACKGROUND OF THE INVENTION

1. FIELD OF THE INVENTION

This invention relates to improvements in methods and apparatuses for Controlling the speed and delay of windshield wipers, and more particularly to improvements in methods and apparatuses for precisely establishing the delay of windshield wiper operation and controlling the speed of the windshield wiper driving motor.

2. DESCRIPTION OF THE RELEVANT BACKGROUND

Modern windshield wiper controls typically provide two windshield 10 wiper speeds. The speeds are usually realized by a motor having two field windings arranged such that one winding produces a faster motor speed than the other. The wiper speed is therefore controlled by selectively energizing one or the other of the windings. A typical prior art windshield wiper system 10 is shown in FIG. 1. In the prior art system 10, a motor 11 has two field coil windings, one or the other of which can be selected by closing one or the other of switches 13 or 14 to complete the circuit with the battery 15.

Some windshield wiper controls provide an intermittent capability in which a delay is established between successive wipes by the wipers. The common way by which such delay is accomplished is by a variable resistor 20 to provide a variable RC time constant to drive a relay 22 according to the particular delay selected.

Typical prior art windshield wiper control systems, however, have several undesirable aspects. For example, since mechanical switches and relays are ordinarily used, electrical noise often accompanies windshield wiper operation. Such electrical noise may interfere with other electrical systems in the vehicle on which the windshield wiper control system is employed. Also, the delay provided by most windshield wiper drivers is difficult to adjust for various weather conditions for comfortable driving. Usually, the adjustment is a "cut and try" approach in which the operator selects an arbitrary windshield wiper delay. After the operator observes the effectiveness of the windshield wiper action makes an adjustment in the delay to produce a windshield wiping timing that maintains a clear windshield without unnecessary wiping. Usually one or more iterations are required to arrive at the ultimate adjustment for the particular windshield wiping delay.

SUMMARY OF THE INVENTION

In light of the above, therefore, it is an object of the invention to provide an improved windshield wiper control system.

It is another object of the invention to provide an improved method for operating a windshield wiper.

It is another object of the invention to provide an improved windshield wiper control system and method of the type described in which the delay of the windshield wipers can be more precisely and instantaneously adjusted than heretofore.

It is another object of the invention to provide an improved windshield wiper control system and method of the type described that enable the weight and complexity of windshield wiper driving motors to be reduced.

These and other objects, features and advantages of the invention will be apparent to those skilled in the art from the following detailed description of the invention, when read in conjunction with the accompanying drawings and appended claims.

According to a broad aspect of the invention, a windshield wiper system is presented that includes a dc motor for connection to drive a windshield wiper. A motor current switch controls current through a field winding of the dc motor. First and second speed selection switches are provided for selecting a speed desired for the windshield wiper. Means responsive to actuation of the first speed selection switch operates the motor current switch to control the current through the field winding of the dc motor for a first duty cycle, and means responsive to actuation of the second speed selection switch for operating the motor current switch to control the current through the field winding of the dc motor for a second duty cycle different from the first duty cycle.

According to another broad aspect of the invention, a windshield wiper system is presented including a motor for connection to drive a windshield wiper and a circuit for operating the motor to drive the windshield wiper. A delay switch is provided, and a motor drive circuit responsive to a first activation of the switch enables the circuit for operating the motor to drive the windshield wiper once. A circuit responsive to a second activation of the switch enables the motor drive circuit to drive the windshield wiper at intervals determined by a time between the first and second activations of the switch.

In a preferred embodiment, the circuit responsive to a second activation of the delay switch to enable the motor drive circuit to drive the windshield wiper at intervals determined by a time between the first and second activations of the delay switch, the circuit to control the current for a first duty cycle and the circuit to control the current for a second duty cycle is a programmed digital computer.

According to still another broad aspect of the invention, a method for operating a windshield wiper is presented. The method includes the steps of operating a delay switch a first time to run a windshield wiper driving motor a first time, operating the delay switch a second time to run the windshield wiper driving motor a second time, timing the delay between the first and second times the delay switch was operated, and after that running the windshield wiper driving motor according to the delay that is timed in the timing step.

In a preferred embodiment, a programmed digital computer performs the steps of timing the delay between the first and second times the delay switch was operated, running the windshield wiper driving motor according to the delay that is timed in the timing step, and controlling the duty cycle of a current through a field coil of the motor to vary the speed of the motor.

BRIEF DESCRIPTION OF THE DRAWING

The invention is illustrated in the accompanying drawing, in which:

FIGS. 2A and 2B are waveforms of the output delivered to the driver transistor to operate the windshield wipers in fast and slow operating modes.

In the various figures of the drawing, like reference numerals are used to denote like or similar parts or program steps.

DETAILED DESCRIPTION OF THE PREFERRED EMBODIMENTS

Figure 1:
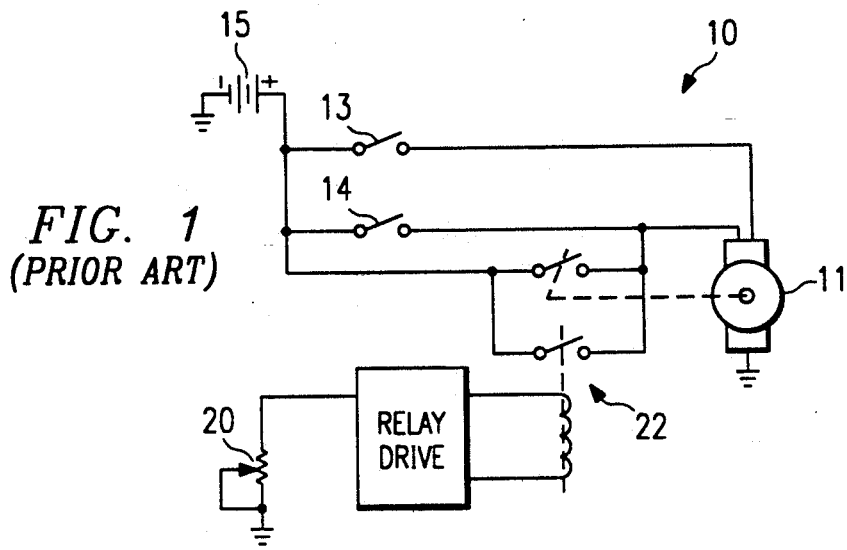
FIG. 1 is an electrical schematic diagram of a windshield wiper control circuit, according to the prior art.
Figure 2:
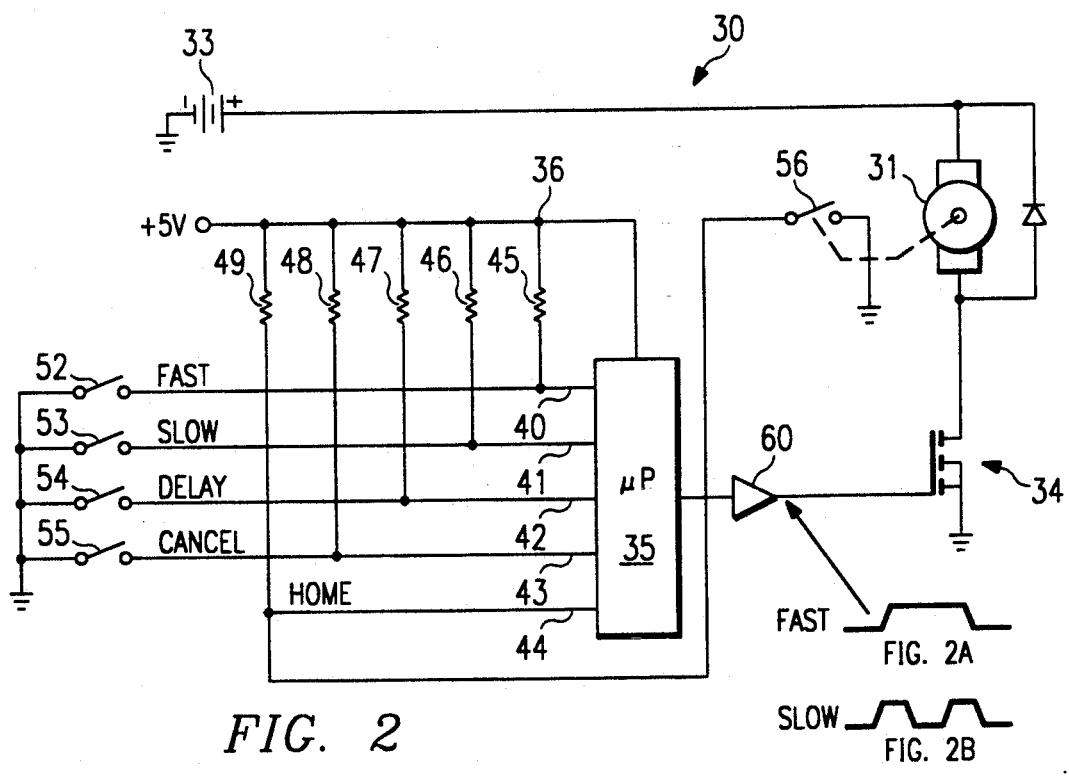
FIG. 2 is an electrical schematic diagram of a windshield wiper control circuit, according to a preferred embodiment of the invention.

A windshield wiper control circuit 30 according to a preferred embodiment of the invention is shown in FIG. 2. The circuit 30 includes a dc motor 31 for driving one or more windshield wipers (not shown). A battery 33 is connected between the motor 31 and ground to supply driving current to one side of the motor 31. As shown, the motor 31 can be a dc motor having only one field winding arrangement. That is, the motor 31 is not required to have separate high and low speed field coil windings. A power transistor 34 is connected to the other side of the motor to control the current flowing from the battery 33 through the field windings of the motor 31 to ground. It will be appreciated that in most automotive applications the power transistor 34 may preferably be connected between the motor 31 and the battery 33, with the opposite side of the motor 31 connected to ground. Thus, the selection of either the fast or slow speed switch 52 or 53 results in output pulses being delivered to the gate of the power transistor 34. Moreover, the pulses are of such width that the current through the motor 31 is controlled in a manner described below in detail, thereby operating the motor at fast or slow speed.

A microprocessor 35 is connected to receive power from a voltage supply source on line 36. The voltage supply may be derived, for example, from a voltage regulator (not shown) connected to the battery 33. A number of input lines 40-44 are connected to corresponding inputs to the microprocessor 35, each line 40-44 being held ordinarily at the potential on line 36, delivered by respective resistors 45-49. The voltage on the line 36 represents a logic "high" state.

Five switches 52-56 are provided to connect respective lines 40-44 selectively to ground. The switches 52-56 serve to change the state momentarily on the selected line from the +5 power supply voltage to a low logic state. Although the switches 52-56 have been shown connected to pull their respective normally high inputs to the microprocessor low, they could alternatively be connected with their respective resistors connected to ground and the opposite switch terminals connected to a positive voltage to switch the normally low input terminals to the microprocessor high.

The switches 52-56 can be defined selectively to signal various operating modes desired to the microprocessor 35. For example, in the embodiment shown, the switch 52 is used to select a fast windshield wiper mode, whereas switch 53 is used to select a slow mode. (Since the particular operating modes are effected through operation of software programmed within the microprocessor 35, or an associated memory, various other functions can be easily provided; for example, a simultaneous selection of switches 52 and 53 can select a medium speed between the fast speed selected by switch 52 and the slow speed selected by switch 53.)

In the embodiment illustrated, switch 56 provides a "home" requirement for the windshield wipers, and may be actuated, for example, through normal operation of the motor 31 when the wiper has reached a limit of its sweep. Next, a delay function is selected in a manner described below in detail by actuating one or more times the switch 54 connected to the line 42. Finally, the operation of the windshield wiper can be canceled by the operation of the switch 55 connected to the line 43.

The particular function selected through operation of the switches 52-56 is controlled by a microprocessor 35. The microprocessor 35 delivers an output to a gate driver 60 to control the current flowing through a power transistor 34 in the current path of the field winding of the motor 31.

Thus, with respect to the speed of the dc motor 31, the speed can easily be varied by varying the width of the gate drive signal supplied to the power transistor 34. For example, if the fast speed selection switch 52 is activated, a pulse having a relatively high duty cycle can be applied to the gate of the power transistor 34. Such a signal is shown, for example, in FIG. 2A. On the other hand, if the slow speed selection switch 53 is activated, a drive signal having a relatively low duty cycle can be applied to the gate of the drive transistor 34. Such a signal is shown, for example, in FIG. 2B.

Figure 3A:
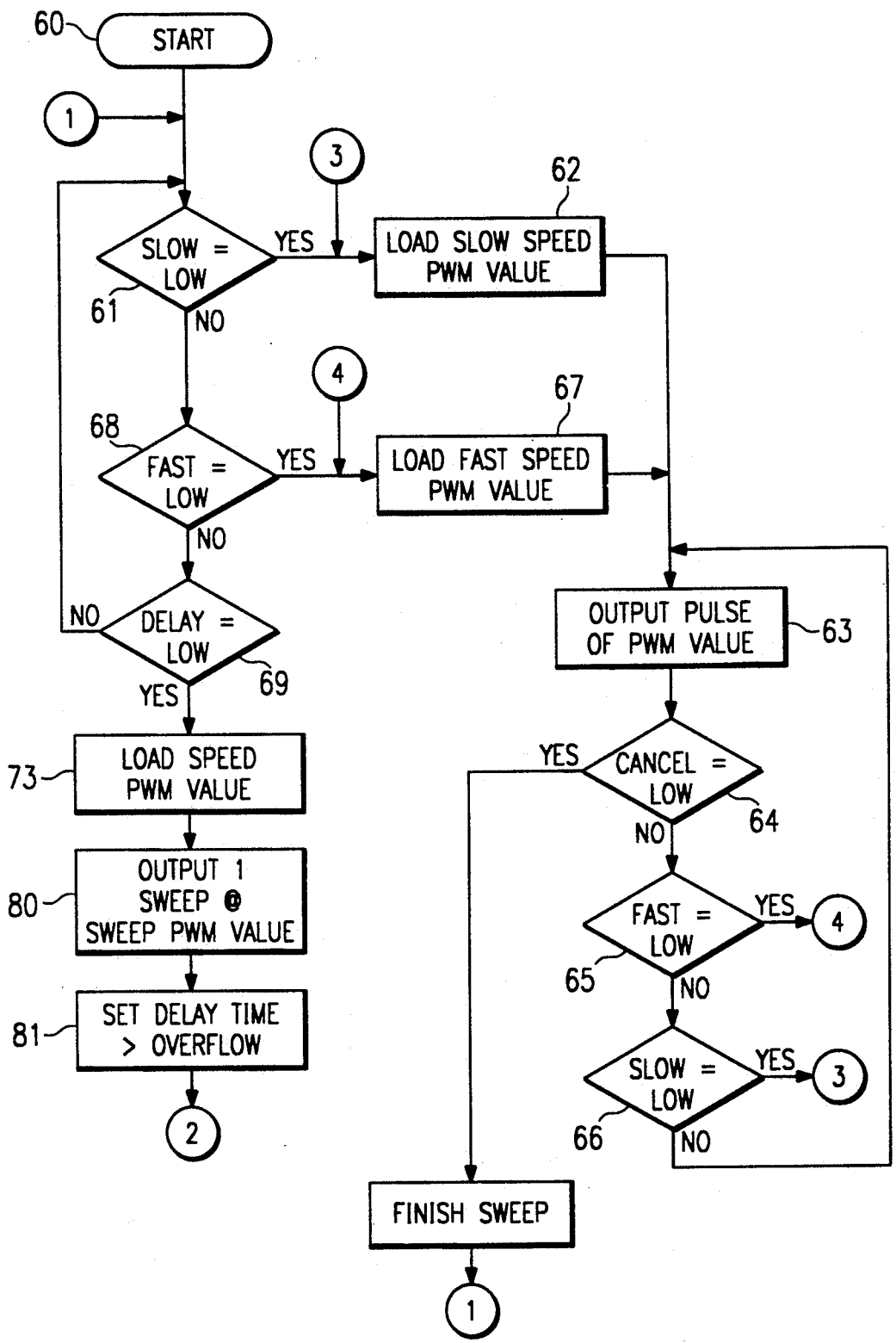
FIGS. 3A-3C is a flow chart of a program that can be employed in the operation of the windshield wiper circuit of FIG. 2 employing momentary selection switches.
Figure 3B:
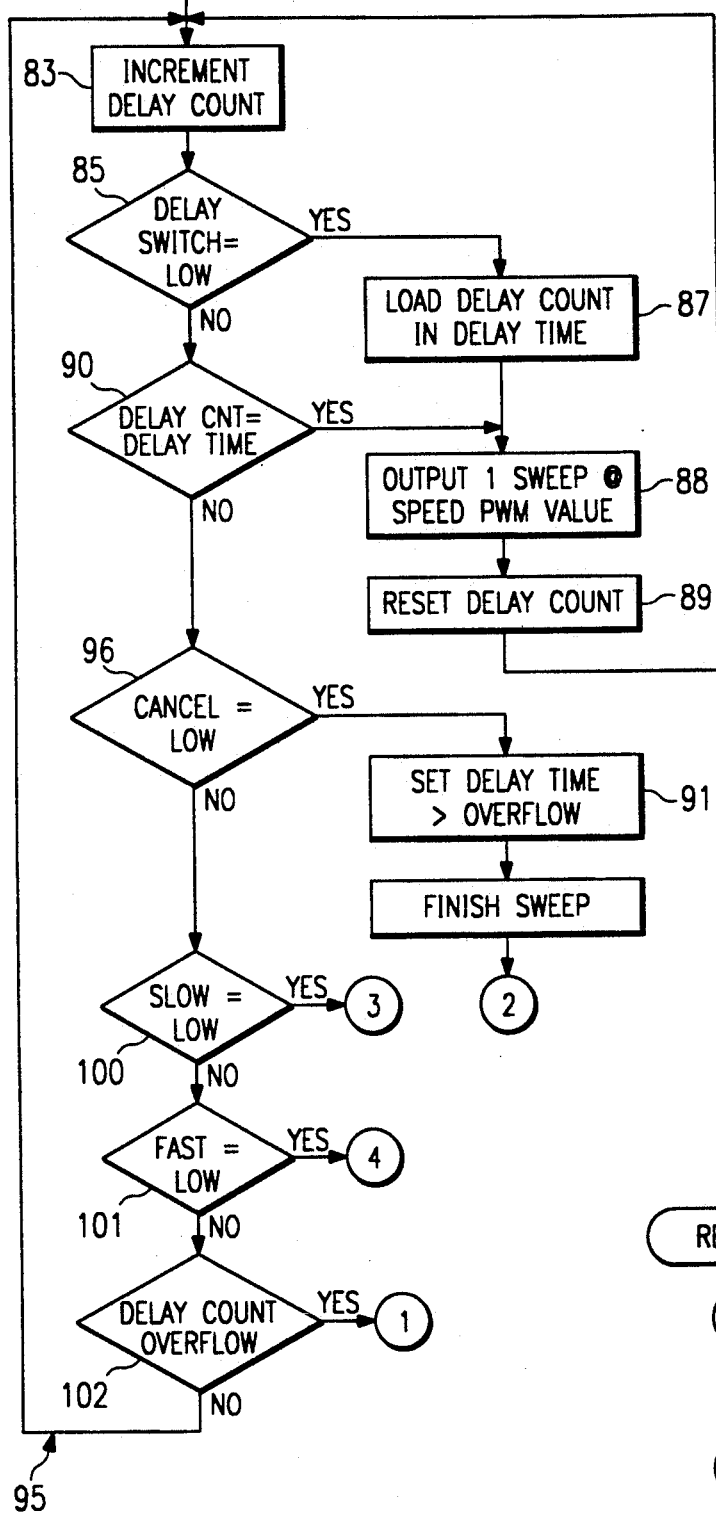
Figure 3C:
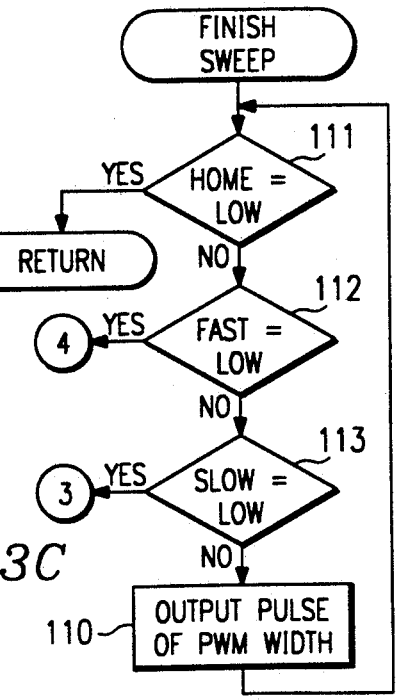

As mentioned, the actual drive signal generation is controlled by the software within the microprocessor 35. A flow chart of a typical program that can be employed to generate the drive signals to the power transistor 34 is shown in FIGS. 3A-3C. The program of FIGS. 3A-3C can be used with momentary type selection switches or button switches, if desired; however, an alternative program that can be used with standard continuous selection switches can be used. An example of such continuous switch program is described below. The program begins from a start state 60, from which the change of state from high to low at the inputs of the respective fast, slow, and delay inputs from respective switches 52, 53, or 54 is checked.

For example, the first check 61 is to determine whether the slow speed selection switch 53 has been closed to bring line 41 low. If the slow speed selection switch 53 has been selected, a slow speed PWM value 15 can be loaded 62 into a counter for controlling the duty cycle of the output pulses. The PWM value can be obtained, for example, from a memory or look up table (not shown) associated with the microprocessor 35. The output pulses are then generated 63, having a PWM value proportional to the PWM value that is loaded, and delivered to the power transistor 34 to operate the windshield wiper motor in accordance with it.

As the output pulses are delivered to the power transistor 34, the state of the cancel switch 55 is checked 64. If the cancel switch 55 has been actuated, the sweep is finished 70, and the states of the speed and delay switches are again monitored at the initial start state 60. On the other hand, if the cancel switch 55 has not been found to have been actuated 64, the operating loop is repeated. Actuation of the fast switch 52 is first checked 65. If the fast speed switch 52 is found not to have been closed, the search is continued to determine if the slow speed switch 53 may have been again closed. If either the high or low speed switches 52 or 53 has been closed, respective high or slow speed PWM value is again retrieved from the memory or look up table. The retrieved PWM value can be loaded, 67 or 62, and the process continued with the new PWM value. On the other hand, if neither the fast nor slow speed switches 52 and 53 has been found not to have been operated, the PWM value previously loaded is used to generate output pulse width modulated pulses having a duty cycle specified by the PWM value.

On the other hand, if, from the initial start state 60, neither the fast nor the slow speed switches 52 or 53 have been found to have been actuated, the state of the delay switch 54 is tested 69. If the delay speed switch 54 is found not to have changed state, the slow, fast, and delay switch monitoring is continued from the start state 60. But, if the delay speed switch 54 is found to have changed state from high to low, a PWM value corresponding to the desired delay speed is loaded 73, and a drive pulse outputs to operate the wiper motor at the selected PWM value 80. Such PWM value may be, for example, a value that produces a pulse width modulated output signal at the gate of the drive transistor 34 that produces a slow speed operation of the motor 31. However, it should be noted that the wiper is swept only once 80.

At this point, the delay desired by the operator is then determined. First, a delay time held in a delay time register is set above an overflow value 81. The delay counter is then reset and a delay count and increment loop is entered. The count in the delay counter is incremented 83. The state of the delay switch is again checked 85, to determine if it has again been actuated. If it is found that the delay switch has not been actuated a second or subsequent time, the delay count then existing is compared with the delay time 90. Until the delay switch has been actuated for a second time, the delay time will remain at the overflow value loaded into the delay time register in box 81. Until that time, the delay calculation loop 95 on the left side of the FIG. 3B is executed.

In the execution of the delay calculation loop 95, the state of the cancel switch is checked 96 upon each pass through the loop. If it is found to have been actuated, the delay time is set again to a time greater than the overflow value, and the finish sweep routine is executed. On the other hand, if the cancel switch is found not to have been actuated, the states of the slow and fast speed switches 53 and 52 are checked, in diamonds 100 and 101. If either has been actuated, the process continues in the slow or fast speed operating mode, as described above. If neither the fast nor slow switch has been found to have been actuated, the delay count is checked for overflow 102. If overflow is found, the entire process is reinitiated from the start state 60. But, if an overflow state has not been found to exist, the delay count is then incremented 83, and the process continued.

When the second actuation of the delay switch is found 85, the count then existing in the incrementing delay counter is loaded into the delay time register 87. A wiper signal is then generated 88, to sweep the wiper once at the speed of the PWM value previously loaded in box 73. The delay counter is then reset 89, and reincremented, the comparison with the value held in the timing register in diamond 90 being now compared against the delay time value loaded in box 87.

It should be noticed that if the operator desires a shorter wiper sweep time, he needs only to reactuate the delay switch for a third (or subsequent) time, and the new delay count then existing will be loaded into the delay time register in box 87. If a longer delay time is desired, in the embodiment shown, the cancel switch is actuated, and the loop reentered from the beginning.

The finish sweep routine is shown in FIG. 3C, and is entered when the cancel switch is actuated, as described above. The position of the wiper motor (and the wiper) is examined 111, to determine if the wiper is in "home" position. If so, the entire process is reinitiated, beginning at the start state 60 (FIG. 3A). If the wiper position is not found at home, the actuation of the fast and slow speed switches are examined 112 and 113. If either is found to have been actuated, the fast or slow modes of operation, described above, are executed. If neither the fast nor slow switches have been actuated, execution of the finish sweep loop is continued, and the output pulse of the PWM value previously loaded is executed 110. The loop is continued until the wiper is found at the home position.

As mentioned above, the invention can be used with continuous fast and slow selection switches, as well as momentary type contact or button switches. If continuous type fast and slow selection switches are employed, a program such as that shown in Figure can be used in conjunction with the apparatus of FIG. 2. The program steps are the same as those described above with regard to FIG. 3B, except for those steps selected in response to the activation of either the fast switch 52 or slow switch 53.

Figure 4:
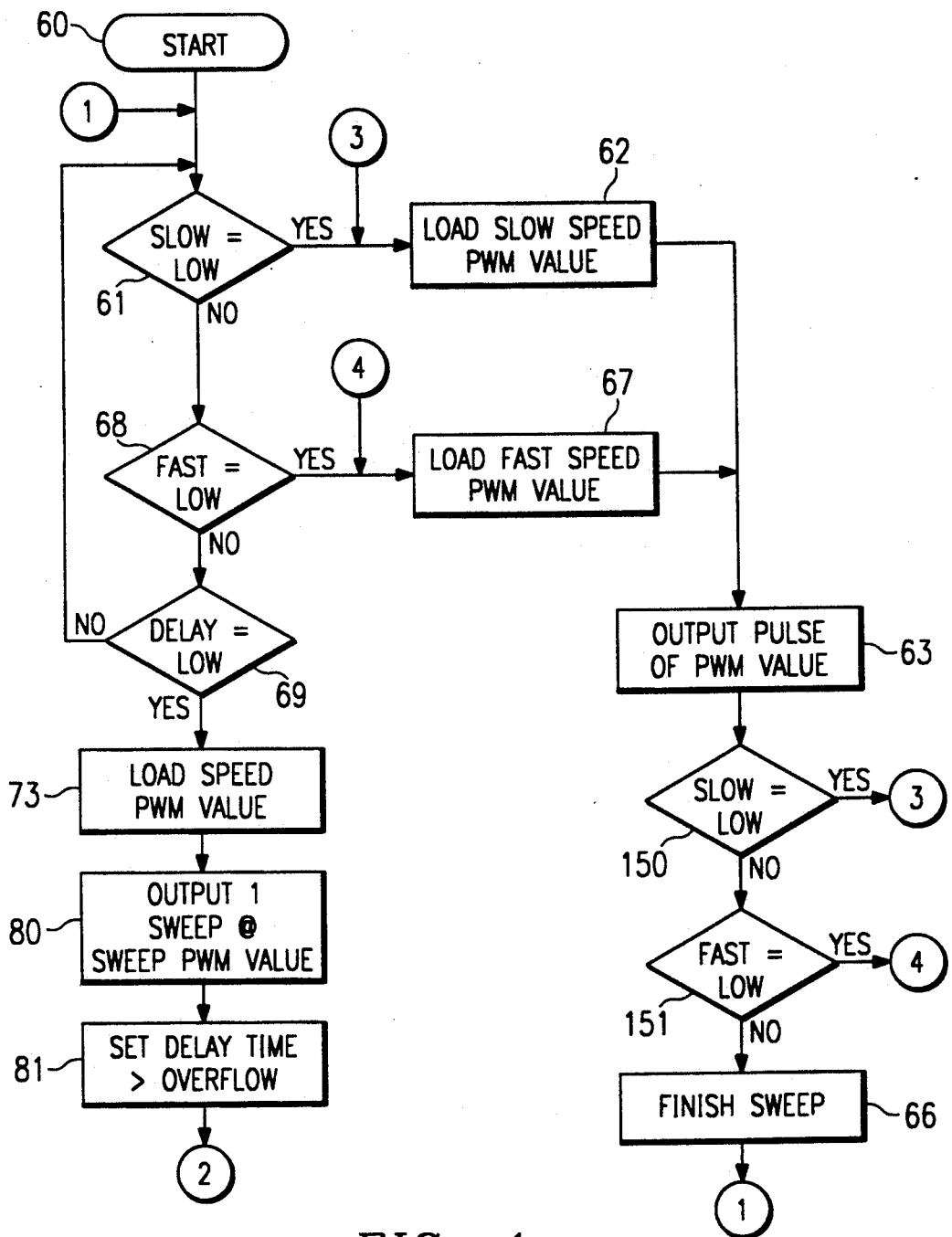
FIG. 4 is a flow chart corresponding to the flow chart of FIG. 3B showing a program that can be used in the delay circuit portion of the invention, using continuous selection switches.

Thus, with reference now to FIG. 4, after a pulse of PWM value is output 63 in response to the actuation of a slow or fast switch 61 or 68, the state Of the slow or fast switches is checked again 150 and 151. If either switch is still in its activated state, the program continues in the respective fast or slow loop, loading the selected PWM value, and outputting the pulse to the driver transistor 34 in accordance with the PWM value loaded. Since the switches maintain the low state when activated until they are turned off, no cancel step is required, in contrast to the momentary switch embodiment.

Thus, in summary of the operation of the delay feature of the circuit of the invention, the delay operation of the motor 31 is started by actuation of the delay switch 54. The actuation of the delay switch 54 results in a single sweep activation of the motor 31. The motor 31 will not again be started until the delay switch 54 is actuated for a second time. Then, the motor 31 will continue to operate at the timing established between the first and second actuations of the switch 54. The operation will be at a speed determined by the PWM value that is preselectedly loaded in the motor driver output circuitry. To cancel the operation of the circuit under any of the operating conditions, the cancel switch 55 can be depressed or actuated.

To perform this operation, after the delay switch has been closed once, the delay count is allowed to advance in loop 95. During the count of the delay count, the state of the delay switch 54 is continually reexamined 85, to determine whether it has again been selected. If the delay switch 54 has not been selected a second time, the count of the delay counter is allowed to continue to increment in box 83. When the delay switch has been selected a second time again to change the state on the line 43 from high to low, the count then existing in the delay counter counted is loaded into a delay time register 87.

After the count from the delay counter has been loaded into the delay time register 87, output pulses are generated whenever the delay count equals the delay time value. This controls the motor 31 to operate at a speed proportional to the predetermined speed established by the PWM value that was loaded in box 73.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A windshield wiper system, comprising:
    a motor for connection to a windshield wiper;
    a circuit for operating said motor to drive the windshield wiper;
    a switch;
    a motor drive circuit responsive to a first activation of said switch to enable said circuit for operating said motor to drive the windshield wiper for one sweep across a windshield;
    a circuit responsive to a second activation of said switch enable said motor drive circuit to drive the windshield wiper at intervals determined by a time between said first and second activations of said switch; and
    a circuit responsive to a third activation of said switch to enable said motor drive circuit to drive the windshield wiper at intervals determined by a time between a last sweep which directly precedes said third activation of said switch and said third activation of said switch.

2. The windshield wiper system of claim 1 wherein said circuit responsive to a second activation of said switch and said circuit responsive to a third activation of said switch are additionally operative to enable said motor drive circuit to drive the windshield wiper immediately upon said second activation and said third activation, respectively, of said switch.

3. The windshield wiper system of claim 1 wherein said motor is a dc motor.

4. The windshield wiper system of claim 3 further comprising:
    at least one speed selection switch for selecting a speed desired for the windshield wiper;
    a circuit responsive to actuation of said at least one speed selection switch for controlling duty cycle of a current through a field winding of said motor to adjust the speed of said motor.

5. The windshield wiper system of claim 3 further comprising:
    first and second speed selection switches for respectively selecting a first and a second speed desired for the windshield wiper;
    a circuit responsive to actuation of said first speed selection switch to control the current through a field winding of said dc motor at a first duty cycle; and means responsive to actuation of said second speed selection switch to control the current through the field winding of said dc motor at a second duty cycle different from said first duty cycle.

6. The windshield wiper system of claim 1 further comprising a switch for controlling a current through a field winding of said dc motor.

7. The windshield wiper system of claim 1 wherein said switch for controlling a current through a field winding of said motor is a power transistor.

8. The windshield wiper system of claim 7 wherein said power transistor is an FET.

9. The windshield wiper system of claim 5 wherein a programmed digital computer comprises said circuit responsive to a second activation of said switch to enable said motor drive circuit to drive the windshield wiper at intervals determined by a time between said first and second activations of said switch, said circuit responsive to a third activation of said switch to enable said motor drive circuit to drive the windshield wiper at intervals determined by a time between said last sweep and said third activation of said switch, said circuit for operating said motor current switch to control the current for a first duty cycle and said circuit for a second duty cycle.

10. A windshield wiper system, comprising:
    a motor for connection to a windshield wiper, said motor having a field winding;
    a control circuit for operating said motor to drive the windshield wiper, said control circuit including:
    a delay switch;
    a motor drive circuit responsive to a first activation of said delay switch to enable said control circuit for operating said motor to drive the windshield wiper for one sweep across a windshield;
    a circuit responsive to a second activation of said delay switch to enable said motor drive circuit to drive the windshield wiper at intervals determined by a time between said first and second activations of said delay switch;
    a circuit responsive to a third activation of said delay switch to enable said motor drive circuit to drive the windshield wiper at intervals determined by a time between a last sweep which directly precedes said third activation of said switch and said third activation of said switch;
    a fast speed selection switch;
    a slow speed selection switch;
    a circuit responsive to actuation of said fast speed selection switch to control the current through the field winding of said motor at a first duty cycle; and
    a circuit responsive to actuation of said slow speed selection switch to control the current through the field winding of said motor at a second duty cycle less than said first duty cycle.

11. The windshield wiper system of claim 10 wherein said circuit responsive to a second activation of said delay switch and said circuit responsive to a third activation of said delay switch are additionally operative to enable said motor drive circuit to drive the windshield wiper immediately upon said second activation and said subsequent activation, respectively, of said delay switch.

12. The windshield wiper system of claim 10 wherein said motor is a dc motor.

13. The windshield wiper system of claim 12 further comprising a switch for controlling a current through a field winding of said dc motor.

14. The windshield wiper system of claim 13 wherein said switch for controlling a current through a field winding of said dc motor is a power transistor.

15. The windshield wiper system of claim 14 wherein said power transistor is an FET.

16. The windshield wiper system of claim 10 wherein said first and second speed selection switches are momentary switches.

17. The windshield wiper system of claim 10 wherein said first and second speed selection switches are continuous switches.

18. The windshield wiper system of claim 10 wherein a programmed digital computer comprises said circuit responsive to a second activation of said delay switch to enable said motor drive circuit to drive the windshield wiper at intervals determined by a time between said first and second activations of said delay switch, said circuit responsive to a third activation of said delay switch to enable said motor drive circuit to drive the windshield wiper at intervals determined by a time between said last sweep and said third activation of said delay switch, said circuit to control the current for a first duty cycle and said circuit to control the current for a second duty cycle.

19. A method for operating a windshield wiper, comprising the steps of:
   activating a delay switch a first time to run a windshield wiper driving motor a first time;
   activating the delay switch a second time to run the windshield wiper driving motor a second time;
   timing the delay between the first and second activations of the delay switch;
   thereafter running the windshield wiper driving motor according to the delay between the first and second activations of the delay switch;
   activating a delay switch a third time to run the windshield wiper driving motor a third time;
   timing the delay between a last running of the windshield wiper motor directly preceding the third activation of the delay switch and the third activation of the delay switch; and
   thereafter running the windshield wiper motor according to the delay between the last running of the windshield wiper motor directly preceding the third activation of the delay switch and the third activation of the delay switch.

20. The method of operating a windshield wiper according to claim 19 further comprising controlling the duty cycle of a current through a field coil of said motor to vary the speed of the motor.

21. The method of operating a windshield wiper according to claim 20 further comprising the step of providing a programmed digital computer to perform said steps of timing the delay between the first and second activations of the delay switch, timing the delay between the last running of the windshield wiper motor directly preceding the third activation of the delay switch and the third activation of the delay switch, running the windshield wiper driving motor according to the delay that is timed in said timing steps, and controlling the duty cycle of a current through a field coil of said motor to vary the speed of the motor.

22. A windshield wiper control system, comprising:
   a motor for connection to a windshield wiper;
   a control circuit for operating said motor to drive the windshield wiper, said control circuit including:
   a switch;
   a motor drive circuit responsive to a first activation of said switch to enable said control circuit for operating said motor to drive the windshield wiper for one sweep across a windshield;
   a circuit for determining a first delay interval responsive to a second activation of said switch, wherein said first delay interval is equal to a time between said first activation and said second activation of said switch;
   a controller for controlling said motor drive circuit to drive the windshield wiper intermittently at intervals equal to said first delay interval; and
   a circuit responsive to a third activation of said switch for shortening said first delay interval and for outputting a shortened delay interval to said controller; wherein
   said controller controls said drive circuit to drive the windshield wiper intermittently at intervals equal to said shortened delay interval in response to receiving the shortened delay interval.

23. A windshield wiper control system, comprising:
   a motor for connection to a windshield wiper;
   a control circuit for operating said motor to drive the windshield wiper, said control circuit including:
   a delay switch;
   a cancel switch;
   a motor drive circuit responsive to a first activation of said switch to enable said control circuit for operating said motor to drive the windshield wiper for one sweep across a windshield;
   a circuit responsive to a second activation of said delay switch to enable said motor drive circuit to drive the windshield wiper at intervals determined by a time between said first and second activations of said delay switch;
   a circuit responsive to an activation of said cancel switch for stopping said motor drive circuit from driving the windshield wiper at intervals determined by a time between said first and second activations of said delay switch; and
   a circuit responsive to a third activation of said delay switch to enable said motor drive circuit to derive the windshield wiper at intervals determined by a time between a last sweep and said third activation of said delay switch.

24. A windshield wiper control system, comprising:
   a motor for connection to a windshield wiper;
   a control circuit for operating said motor to drive the windshield wiper, said control circuit including:
   a delay switch;
   a cancel switch;
   a motor drive circuit responsive to a first activation of said delay switch to enable said control circuit for operating said motor to drive the windshield wiper for one sweep across a windshield;
   a circuit for determining a first delay interval responsive to a second activation of said delay switch, wherein said first delay interval is equal to a time between said fist activation and said second activation of said delay switch;
   a controller for controlling said motor drive circuit to drive the windshield wiper intermittently at intervals equal to said first delay interval;
   a circuit responsive to an activation of said cancel switch for stopping said motor drive circuit from driving the windshield wiper intermittently at intervals equal to said first delay interval; and
   a circuit responsive to a third activation of said delay switch for outputting a lengthened delay interval to said controller;
   wherein said controller controls the drive circuit to drive the windshield wiper intermittently at intervals equal to said lengthened delay interval in response to receiving the lengthened delay interval.

25. A method for operating a windshield wiper, comprising the steps of:

activating a delay switch a first time to run a windshield wiper driving motor a first time;

activating the delay switch a second time to run the windshield wiper driving motor a second time;

timing the delay between the first and second activations of the delay switch;

thereafter running the windshield wiper driving motor according to the delay between the first and second activations of the delay switch;

activating a cancel switch to stop the running of the windshield wiper driving motor according to the delay between the first and second activations of the delay switch;

activating a delay switch a third time to run the windshield wiper driving motor a third time;

timing the delay between a last running of the windshield wiper motor and the third activation of the delay switch; and thereafter running the windshield wiper motor according to the delay between the last running of the windshield wiper motor and the third activation of the delay switch.

26. The method of operating a windshield wiper according to claim 25 further comprising the step of providing a programmed digital computer to perform said step of providing a programmed digital computer to perform said steps of timing the delay between the first and second activations of the delay switch, timing the delay between the last running of the windshield wiper motor and the third activation of the delay switch, running the windshield wiper driving motor according to the delay that is timed in said timing steps, and controlling the duty cycle of a current through a field coil of said motor to vary the speed of the motor.

* * * * *

UNITED STATES PATENT AND TRADEMARK OFFICE
CERTIFICATE OF CORRECTION

PATENT NO. : 5,254,916

DATED : October 19, 1993

INVENTOR(S) : Thomas Lea R. Hopkins

It is certified that error appears in the above-indentified patent and that said Letters Patent is hereby corrected as shown below:

On the title page, Item [54] and in Column 1, lines 2 and 3, the title should read --WINDSHIELD WIPER INTERMITTENT DELAY INTERVAL CONTROL--.

Signed and Sealed this

Tenth Day of May, 1994

Attest:

BRUCE LEHMAN

Attesting Officer    Commissioner of Patents and Trademarks